No. 803,593. PATENTED NOV. 7, 1905.
E. HILL.
VARIABLE SPEED MECHANISM.
APPLICATION FILED FEB. 17, 1905.

Witnesses.
C. H. Storrs.
Ethel M. Lowe.

Inventor.
Ebenezer Hill
per
Harry R. Williams
Attorney.

UNITED STATES PATENT OFFICE.

EBENEZER HILL, OF NORWALK, CONNECTICUT.

VARIABLE-SPEED MECHANISM.

No. 803,593.    Specification of Letters Patent.    Patented Nov. 7, 1905.

Application filed February 17, 1905. Serial No. 246,059.

*To all whom it may concern:*

Be it known that I, EBENEZER HILL, a citizen of the United States, residing at Norwalk, in the county of Fairfield and State of Connecticut, have invented a new and useful Variable-Speed Mechanism, of which the following is a specification.

This invention relates to a mechanism for varying the speed of rotation of a driven shaft.

The object of the invention is to provide a mechanism by means of which a driven shaft may be rotated at a predetermined speed with relation to the driver or at double that speed, as desired, without shifting belts, gears, or clutches.

The embodiment of the invention that is illustrated has a pulley loosely mounted on the driven shaft and containing a box of intermeshing bevel-gears. Two of the gears are carried by the pulley. One is fixed to the shaft and the other is loose on the shaft, but is provided with means for locking it to the shaft and means for holding it immovable.

Figure 1:
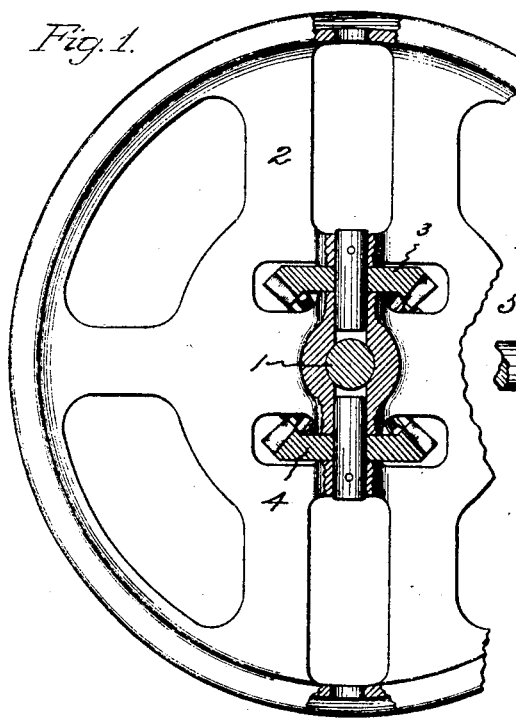
Figure 2:
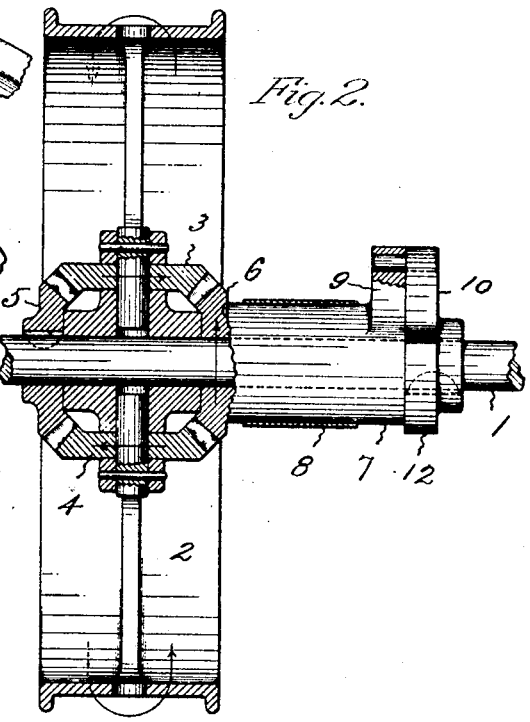
Figure 3:
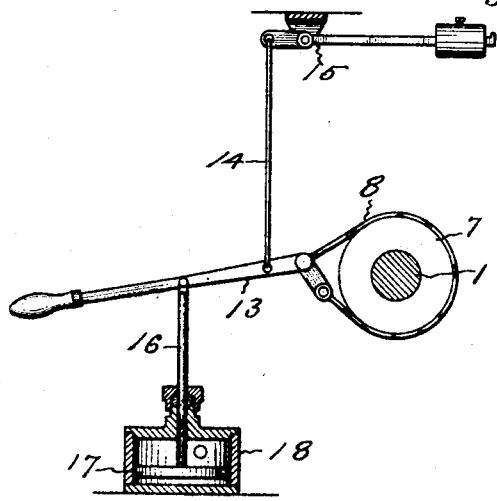
Figure 4:
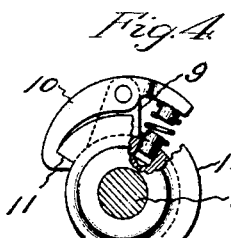

Figure 1 of the accompanying drawings is a view looking at the face of the pulley with a portion broken away. Fig. 2 shows a central longitudinal section of the mechanism. Fig. 3 shows a side elevation of a brake mechanism that may be used, and Fig. 4 is a view looking at the face of a ratchet and pawl that may be employed for connecting the brake-gear with the shaft.

The driven shaft 1 may be supported by any suitable bearing and may be used for any desired purpose. The pulley 2 is loosely mounted on the shaft and may be driven by a belt from any source of power at any desired speed in the direction indicated by the arrows.

The bevel-gears 3 and 4 are mounted so as to turn loosely within the rim of the pulley near the hub. These gears may be mounted on spokes of the pulley, but preferably are mounted on arbors set in the spokes or web of the pulley. The bevel-gear 5, which meshes with the gears 3 and 4, is keyed or otherwise made fast to the driven shaft. The bevel-gear 6, which also meshes with the bevel-gears 3 and 4, is loose on the driving-shaft.

The hub of the bevel-gear 6 is extended along the shaft in the form of a drum 7, and encircling this drum is a brake-band 8. On the end of the drum is an arm 9, carrying a spring-pawl 10, which is arranged to engage a ratchet-shoulder 11 on a disk 12, that is keyed or otherwise fixed to the driven shaft.

The ends of the brake-band are shown as fastened to a brake-lever 13. This lever by a rod 14 is connected with a weighted lever 15, that tends to lift the brake-lever and release the brake, and by a rod 16 is connected with a piston 17 in a cylinder 18, that is adapted to pull down the brake-lever and set the brake.

When the pulley is rotated in the direction indicated by the arrows and the brake is loose, the resistance of the shaft causes the gears 3 and 4, which revolve with the pulley, to rotate in the direction indicated by the arrows on them, and this causes the gear 6, the brake-drum, and the pawl to rotate in the direction indicated by the arrow on this gear. Immediately the pawl engages the ratchet-shoulder on the disk fixed to the shaft and the gear 6 becomes fixed to the shaft, and then as the gear 5 is fixed to the shaft all of the gears stop turning on their axes and become locked so that the pulley and shaft rotate together in the same direction and at the same speed as if one piece.

The brake may be set or released by hand; but where convenient—as, for instance, when the shaft is used for driving the governor of a pump or an air-compressor—fluid-pressure may be applied to the piston in the cylinder for the purpose of setting or releasing the brake, and thus may vary the speed of the governor and the speed of the engine, as is well understood by engineers.

When the brake is set, the gear 6 is held immovable. With this gear immovable and the pulley rotating in the direction indicated by the arrows the gears 3 and 4, which revolve with the pulley, of course with the same number of revolutions, are rotated on their axes by the immovable gear 6 in a direction opposite to that indicated by the arrows on them, and this rotates the gear 5, which is fixed to the shaft, in the same direction as the pulley, but at twice the speed. When the brake is set and the shaft is rotating forwardly, the pawl rides over the ratchet.

By simply setting the brake, whether by hand or foot power or by steam, air, or water, the speed of rotation of the shaft is instantly increased in the same direction to double the speed at which it was previously rotating, and as this change is affected without the shifting of belts or changing the meshing of gears this mechanism is particularly adapted for use with shafts designed to run at high speeds.

The invention claimed is—

1. A variable-speed mechanism having a shaft, a pulley loosely mounted directly on the shaft, four bevel-gears within the pulley, one gear being permanently fixed to the shaft, another being loose on the shaft, and the other two being mounted on the pulley and each meshing with both the fixed and loose gears, means for connecting the loose gear with the shaft, and means for holding the loose gear immovable and disconnected from the shaft, substantially as specified.

2. A variable-speed mechanism having a driven shaft a pulley loose on the driven shaft, gears, one gear being fixed to the shaft, another being loose on the shaft and provided with a brake whereby it may be held immovable, and two being mounted on the pulley, and a ratchet-and-pawl mechanism for connecting the loose gear with the shaft, substantially as specified.

3. A variable-speed mechanism having a driven shaft a pulley loose on the driven shaft, gears within the pulley, one gear being fixed to the shaft, another being loose on the shaft, a ratchet-and-pawl mechanism for connecting the loose gear with the shaft, a brake for holding the loose gear immovable, and means for setting the brake, substantially as specified.

4. A variable-speed mechanism having a driven shaft a pulley loose on the driven shaft, gears within the pulley, one gear being fixed to the shaft, another being loose on the shaft, the latter gear having a brake-drum and a pawl, a ratchet-disk secured to the shaft and adapted to be engaged by the pawl, and a brake adapted to be applied to the drum for holding the loose gear immovable, substantially as specified.

5. A variable-speed mechanism having a driven shaft a pulley loose on the driven shaft, gears within the pulley, two of said gears being mounted so as to rotate on their axes and revolve with the pulley, another gear being fixed to the driven shaft and another being loose on the driven shaft, the latter gear being attached to a brake-drum, a brake adapted to be applied to and released from the drum, and a ratchet and pawl adapted to connect the brake-gear with the shaft when the brake is released, substantially as specified.

EBENEZER HILL.

Witnesses:
HOWARD H. MOSSMAN,
HARRY R. WILLIAMS.